United States Patent [19]

O'Keefe et al.

[11] 4,410,505

[45] Oct. 18, 1983

[54] HYDROGEN IODIDE DECOMPOSITION

[75] Inventors: Dennis R. O'Keefe; John H. Norman, both of San Diego, Calif.

[73] Assignee: GA Technologies Inc., San Diego, Calif.

[21] Appl. No.: 459,680

[22] Filed: Jan. 20, 1983

Related U.S. Application Data

[63] Continuation-in-part of Ser. No. 375,803, May 7, 1982, abandoned.

[51] Int. Cl.³ ............................ E01B 3/02; C01B 7/14
[52] U.S. Cl. ............................... 423/648 R; 423/501; 423/507
[58] Field of Search ............... 423/500, 501, 507, 644, 423/648 R; 210/634

[56] References Cited

U.S. PATENT DOCUMENTS 4,089,940 5/1978 Norman et al. .................. 423/648 R
4,258,026 3/1981 O'Keefe et al. .................. 423/648 R
4,330,374 5/1982 O'Keefe et al. .................. 423/488 X Primary Examiner—O. R. Vertiz
Assistant Examiner—Steven Capella
Attorney, Agent, or Firm—Fitch, Even, Tabin & Flannery

[57] ABSTRACT

Liquid hydrogen iodide is decomposed to form hydrogen and iodine in the presence of water using a soluble catalyst. Decomposition is carried out at a temperature between about 350° K. and about 525° K. and at a corresponding pressure between about 25 and about 300 atmospheres in the presence of an aqueous solution which acts as a carrier for the homogeneous catalyst. Various halides of the platinum group metals, particularly Pd, Rh and Pt, are used, particularly the chlorides and iodides which exhibit good solubility. After separation of the $H_2$, the stream from the decomposer is countercurrently extracted with nearly dry HI to remove $I_2$. The wet phase contains most of the catalyst and is recycled directly to the decomposition step. The catalyst in the remaining almost dry HI-$I_2$ phase is then extracted into a wet phase which is also recycled. The catalyst-free HI-$I_2$ phase is finally distilled to separate the HI and $I_2$. The HI is recycled to the reactor; the $I_2$ is returned to a reactor operating in accordance with the Bunsen equation to create more HI.

20 Claims, 2 Drawing Figures

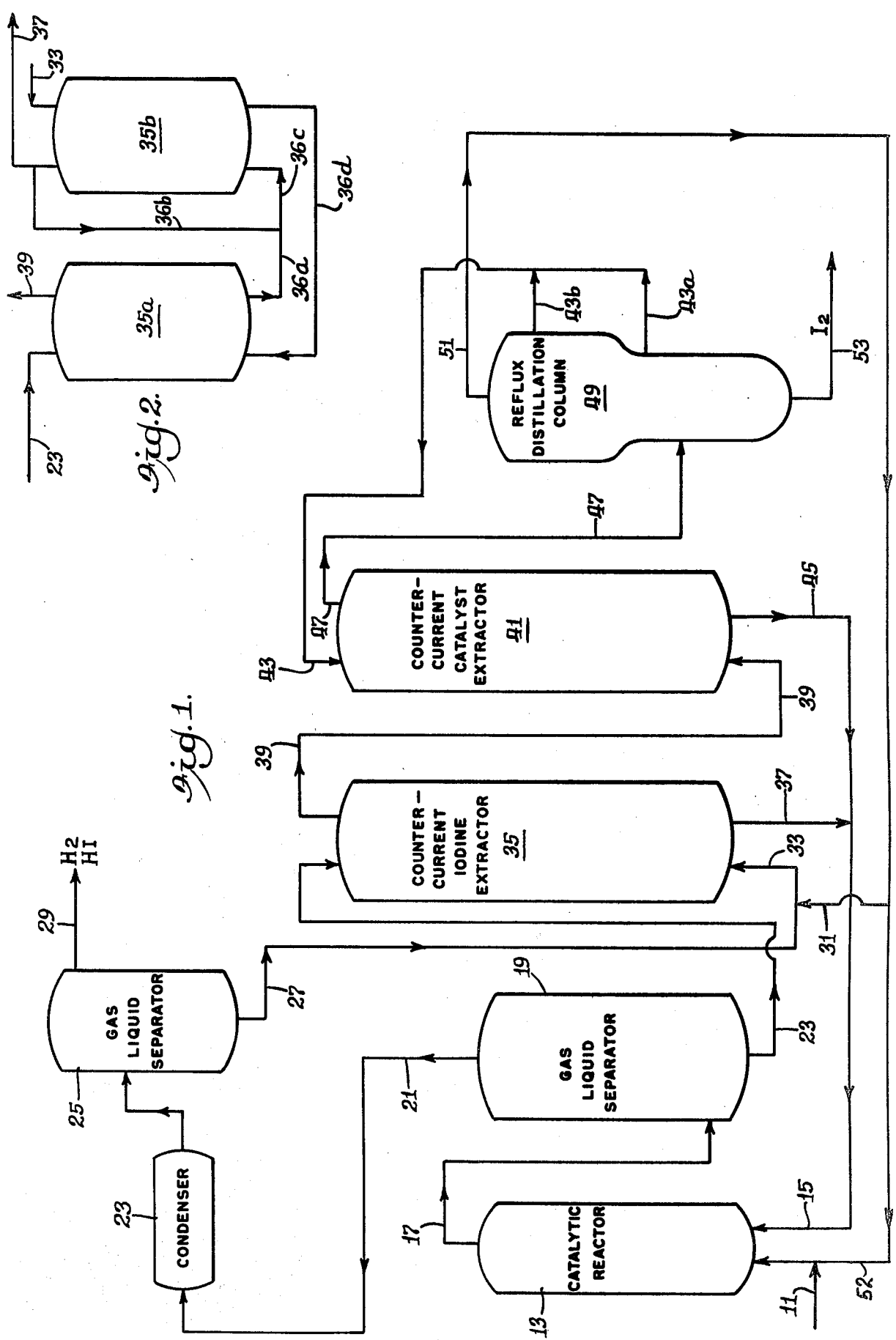

HYDROGEN IODIDE DECOMPOSITION

The present invention relates to the decomposition of hydrogen iodide, and more particularly to a process for producing gaseous hydrogen by catalytically decomposing liquid hydrogen iodide using a homogeneous catalyst. The Government has rights in this invention pursuant to Contract No. DE-AC02- 80ET26225 awarded by the U.S. Department of Energy.

This application is a continuation-in-part of our earlier application Ser. No. 375,803 filed May 7, 1982, now abandoned.

BACKGROUND OF THE INVENTION

Various processes have been proposed for the production of hydrogen from water, some of which create oxygen as a by-product. One such "water-splitting" process produces hydrogen iodide as a part of a closed-cycle chain of chemical reactions and is disclosed in detail in U.S. Pat. No. 4,089,940, issued May 16, 1978 to John H. Norman et al. This process is based upon the Bunsen equation whereby sulphur dioxide, water and iodine are reacted to produce sulfuric acid and hydrogen iodide. This hydrogen iodide must then be broken down to $H_2$ (the desired product) and to $I_2$, which is recovered and returned to the main reaction.

It was found that hydrogen iodide could be economically decomposed in liquid form using a supported catalyst, such as ruthenium on a titania substrate or platinum on a barium sulphate substrate, as set forth in U.S. Pat. No. 4,258,026, issued Mar. 24, 1981 to Dennis R. O'Keefe et al. Although high conversion levels are possible with such a process and although it is considered to be a viable process, the use of such heterogeneous catalysis to decompose liquid HI, has displayed problems wherein the catalyst, particularly platinum, has a tendency to dissolve in liquid HI to a non-negligible degree, requiring some type of a catalyst recovery and remanufacture scheme. Although such catalyst recovery and remanufacture are commonplace in the chemical industry, they add to the complexity of the operation and to the operating and capital costs of the overall process. Accordingly, other equally efficient or more efficient processes were sought.

SUMMARY OF THE INVENTION

A liquid hydrogen iodide decomposition process involving homogeneous catalysis has been developed, as well as an integrated countercurrent solvent-extraction system for catalyst recycling. Soluble platinum group metal salts are used along with an aqueous phase, which serves as a carrier for the catalyst and is believed to take part in the catalysis. The establishment of two liquid phases, one an almost dry phase and one an aqueous phase, allows the catalyst to be totally recycled to the reactor and allows this thermal decomposition process to be carried out efficiently as a part of the overall water-splitting process referred to hereinbefore.

BRIEF DESCRIPTION OF THE DRAWINGS

FIG. 1 is a schematic view of a system for carrying out a liquid hydrogen iodide decomposition process embodying various features of the invention and including the recovery and recycling of a homogeneous catalyst, which for purpose of illustration is palladium iodide; and FIG. 2 is a partial schematic illustrating an alternative embodiment of one portion of the system shown in FIG. 1 relating to the step for the extraction of iodine.

DETAILED DESCRIPTION OF THE PREFERRED EMBODIMENTS

It has been found that a homogeneous catalysis concept is feasible for decomposing liquid HI. An aqueous solution is used as the carrier for the catalyst which should be appropriately soluble and active enough in the decomposition reaction so that only reasonable inventories are required. Salts of the platinum group metals which are soluble in HI-$H_2O$ mixtures have been found to be appropriate and efficient in such homogeneous catalysis of the thermal decomposition of liquid HI. Particularly, the halide salts have the desired solubility, and these platinum group metal salts in an aqueous hydriodic acid solution are active enough to provide the desired reaction rate.

The decomposition is carried out at temperatures which are preferably below the critical temperature of pure HI, i.e. about 425° K., and above abut 350° K. However, if a mixture is present, the HI may be dissolved in another component, i.e. molten $I_2$, and temperatures as high as about 525° K., at pressures up to about 300 atm. might be used. Generally, temperatures between about 300° K. and about 525° K. at pressures from about 25 atm. to about 300 atm. might be used.

The more common members of the platinum metal group are preferred from an economical standpoint, i.e., Pd, Rh and Pt. Inasmuch as catalyst concentrations of less than 1 mole % are generally adequate, the solubility of the salt need not be particularly high, and dissolved HI generally enhances solubility of these salts. Aside and apart from their degree of solubility, there is not considered to be any important difference in the rate of reaction, at a given temperature, between different halide forms of one particular platinum group metal when it is initially used. The rate of reaction of a particular platinum group metal varies somewhat with temperature. Generally, water-soluble salts, as well as those soluble in hydriodic acid, may be used. The Pd and Pt halides are more preferred, and at temperatures of about 350° K. and above, Pd halides are preferred. Examples of potential catalysts include $PdI_2$, $PdCl_2$, $RhCl_3$, $PtI_2$ and $H_2PtCl_6$. $RhCl_3$ is available as $RhCl_3.3H_2O$, and $H_2.PtCl_6$ is available as $H_2PtCl_6.6H_2O$.

Although an aqueous solution is used as the carrier for the homogeneous catalyst, it is also believed that the water plays some part in the catalysis, inasmuch as separate laboratory tests have shown that the presence of water is required for the homogeneous catalyst to be fully active. A sufficient amount of water is employed to carry the necessary amount of catalyst to provide the desired decomposition rate within the desired residence time frame in the decomposition reactor. For example, at a temperature of about 425° K. and a pressure of about 150 atmospheres, $PdI_2$ in a mole ratio of about 1 to 500 ($PdI_2$ to HI) will achieve a conversion of about 48 percent of the HI present in the reactor stream in a residence time of about four seconds or less. Residence times and reaction rates have a major influence on the design of the equipment and the overall process, and they are accordingly important in achieving desired efficiency.

Overall basis for the separation of the catalyst from the product iodine and for its efficient recycle is premised upon the fact that two liquid phases exist in equilibrium in systems containing HI, $H_2O$ and $I_2$, at certain composition ranges of the components, within a range of pressures and at temperatures below the critical temperature of HI (above which it exists only in the vapor phase) or in excess of this temperature when substantial $I_2$ is mixed with HI. This subject matter is disclosed in detail in U.S. Pat. No. 4,330,374, in the names of Dennis R. O'Keefe et al., issued May 18, 1982, the disclosure of which is incorporated herein by reference.

Generally, the basis for separation of the catalyst and for the effective performance of the decomposition reaction lies in carrying the catalyst in a separate liquid phase in contact with the liquid HI. Such a two-liquid phase system is inherently present for certain HI-$H_2O$-$I_2$ mixtures, wherein one phase is a very dry phase of HI and $I_2$ and the other phase is a wet or aqueous phase containing aqueous hydriodic acid and some $I_2$. It has been found that certain homogeneous catalyst compounds tend to concentrate in the aqueous phase and that the aqueous phase acts both as the catalyst carrier and as a vehicle which can be recycled to the HI decomposition reactor without having to specifically recover the catalyst.

Shown in FIG. 1 is a schematic system which represents a flowsheet for a sample process embodying various features of the invention and illustrating the use of a preferred catalyst $PdI_2$. The flowsheet represents the carrying out of the thermal decomposition of hydrogen iodide as it might occur in combination with an overall water-splitting process, such as that mentioned hereinbefore, and reference is sometimes made to that overall process. However, the present decomposition process is not so limited and could be employed regardless of the source of the hydrogen iodide.

More specifically, a feed stream 11 of HI is fed to a reactor 13 wherein catalytic thermal decomposition occurs. Normally, the feed stream 11 will be substantially pure HI, although the presence of some very minor amounts of contaminants, such as $H_2O$ and $I_2$, can be tolerated. The feed stream is preferably pressurized to a pressure of about 150 atmospheres and heated to a temperature of about 425° K. before it is fed to the reactor 13 where it is mixed with the catalyst containing stream 15. Because the critical temperature of pure HI is about 424° K., the stream 11 might be heated to a somewhat lower temperature and the stream 15 to a somewhat higher temperature to achieve the approximate desired reaction temperature within the reactor 13. Alternatively, the reactor 13 can be operated with a thermal gradient along its length allowing higher than pure-HI critical temperatures adjacent the exit. It is presently considered desirable to carry out the reaction between about 400° and 425° K. at a pressure of about 100 to 175 atmospheres although it is considered feasible to carry out the decomposition reaction within a fairly wide pressure range between about 25 and about 300 atmospheres and at corresponding temperatures between about 300° K. and 525° K. Because the critical temperature of HI can rise for some overall compositions, it is felt that the decomposition reaction may practically be carried out at corresponding pressures and temperatures between about 350° K. and about 525° K.

One example of a suitable reactor 13 is a cocurrent plug-flow reactor having internal baffling to assure that intimate mixing of the incoming streams occurs. The two streams 11 and 15 preferably enter at a lower location, and a single stream 17 exits from the top of the reactor. The size of the reactor 13 is of course dependent upon the residence time desired and the overall flow rate of fluid therethrough. Using the aforementioned catalyst, it is felt that a conversion of over about 30 percent and up to about 48 percent can be obtained using the aforementioned catalyst at a residence time of about four seconds or less.

The stream 15 is a recycle stream from the continuous process which contains aqueous hydriodic acid and the catalyst plus some $I_2$, and it enters at the same pressure as the stream 11 and at about the same or a slightly higher temperature. The composition of the stream is controlled so that, at the flow rates in question of the streams 11 and 15, the composition of the combined two entering streams falls within the desired region wherein two liquid phases exist at the temperature and pressure within the reactor. The catalyst is carried in the wet phase, and the dry phase supplies HI to the reaction which is believed to take place almost totally in the wet phase and withdraws the $I_2$ product. $I_2$ and gaseous $H_2$ are produced in the reactor as a result of the catalytic thermal decomposition of HI.

The overhead stream 17 exiting the reactor 13 is made up of liquid plus a gas composition in equilibrium therewith which contains substantially all of the hydrogen created. Hydrogen iodide will be present in the gas phase in accordance with its equilibrium partial pressure, and there will also be minor amounts of iodine vapor and water vapor present, which are of such a lesser amount that they need not be specifically referred to in order to understand the overall process. It should be understood that, within the reactor 13, there will be three phases (liquid-liquid-vapor), with all three phases varying in composition along the length of the reactor from the inlet end to the exit end as HI is decomposed to hydrogen and iodine. The compositions of the streams 11 and 15 and the rates of flow are preferably regulated so that the final composition at the exit end constitutes only a single aqueous liquid phase in equilibrium with the gaseous phase. However, although this is preferred and has certain advantages, the exit composition may be such that two liquid phases exit in equilibrium with the gas phase at the exit end.

The exit stream 17 is routed to a gas-liquid separator 19 of standard design wherein the gas composition exits as an overhead stream 21 and the single phase or the two-phase liquid leaves as a bottom phase 23.

The overhead phase 21 is routed to a condenser 23 where the major portion of the HI, and any water vapor and iodine vapor carried along, will be condensed to liquid and then is routed to a second gas-liquid separator 25. The separator 25 produces an almost dry HI liquid stream 27 and an overhead stream 29 containing the hydrogen and perhaps a minor amount of residual HI. The hydrogen continues in a post-treatment stage to remove any remaining HI and trace amounts of $I_2$ for return to the system using conventional $H_2$ cleanup methods. It is also proposed that a gas turbine may be used to drop the pressure of the $H_2$ gas from about 150 atmospheres to a pipeline quality of about 50 atmospheres to recover some work, and the expansion cooling which occurs may also be used as a part of the cleanup.

The condensed HI liquid stream 27 is reheated and then combined with another HI liquid stream 31, described hereinafter, to form a composite stream 33 of the desired quantity for supply to a countercurrent iodine extractor 35. The combined stream 33 is heated to about the temperature of the stream 23 from the catalytic reactor and gas-liquid separator 19, namely abut 425° K.

The stream 23 containing the liquid from the catalytic reactor 13 that has been separated from the gas phase in the separator 19 is fed into the upper end of the countercurrent iodine extractor 35. This preferably one-phase stream 23 contains the water, all of the catalyst, substantially all of the iodine produced in the reaction and some hydrogen iodide, so that it may be a solution of iodine and catalyst in aqueous hydriodic acid. This solution forms a distinct two-phase mixture with the rising almost dry HI liquid being fed into the bottom as the stream 33. The purpose of the countercurrent extractor 35 is to remove $I_2$ from the catalyst-containing stream so a purer HI liquid phase can ultimately be recycled to the main reactor 13 whereby a good conversion ratio will be maintained in the reactor 13. Migration at the interface between the two distinct phases, as the lighter HI phase rises in the extractor 35 and the heavier, wet phase sinks, effects extraction of substantially all of the iodine from the wet phase. In addition, a slight amount of the water from the wet phase is transferred to the rising dry HI phase, and over 85 mole percent of the HI which enters in the upper stream 23 migrates to the rising dry phase.

The wet phase stream 37 which exits from the bottom of the extractor 35 contains most of the water, nearly all of the catalyst and some HI; for example, it may contain about 1 mole of HI for each two moles of $H_2O$. In this respect, the compositions of the streams are preferably regulated so that at least 95 mole percent of the catalyst remains in this wet phase stream, and it has been found that, using a palladium iodide catalyst at a temperature of about 425° K., over 99 mole percent of the catalyst is carried from the extractor 35 in the wet phase stream 37. The stream 37 is returned to the main reactor and forms the major portion of the recycle stream 15.

The dry phase from the reactor 35 exists as an overhead stream 39 and contains hydrogen iodide and substantially all of the iodine, plus a small amount of water which carries with it less than 1 mole percent of the catalyst. By operating the iodine extractor at about the same temperature and the same pressure at which the catalytic decomposition reaction took place, substantially all of the iodine can be extracted by a relatively dry HI stream of a molar amount less than a third of the amount of the stream 23 being supplied from the gas-liquid separator 19. Of course, because over 85 mole percent of the hydrogen iodide in the stream 23 migrates to the rising dry phase, the total molar amount of the exit stream 39 far exceeds that of the exit stream 37 that is recycled to the reactor 13.

The overhead stream 39 is subjected to a second extraction step to recover the catalyst in an extractor 41, which is termed a countercurrent catalyst extractor; it is fed into the bottom thereof. Supplied to the top of the extractor 41 is a stream 43 having the approximate composition of a wet phase that will be in substantial equilibrium with the dry phase composition of the stream 39. The source of the stream 43 is explained hereinafter.

In the countercurrent catalyst extractor 41, the interface between the two phases is such that the rising dry phase loses substantially all of the catalyst and a very slight amount of the iodine to the sinking wet phase which contains a far greater percentage of water, wherein hydriodic acid is in solution. For example, the mole percent of the wet phase which is water may be over 25 times the mole percent of water of the dry phase. In one example, the ratio of mole percentage of water in the wet phase to mole percentage of water in the dry phase is about 26.2:1, and substantially all of the catalyst is carried from the extractor 41 in the descending wet phase 45 which exits from the bottom thereof. The stream 45, which may be highly concentrated hydriodic acid, e.g., about 3 moles HI to each mole of $H_2O$, is combined with the larger volume stream 37, and together the two make up the recycle stream 15 which is supplied to the catalytic reactor 13.

The dry phase from the countercurrent catalyst extractor 41 exists overhead as a stream 47 containing hydrogen iodide and iodine plus a small amount of water. The stream 47 is then routed to a standard distillation column 49, which is operated with refluxing, where the hydrogen iodide is separated as vapor from the iodine. In order to provide the wet phase stream 43 for the countercurrent catalyst extractor 41, a pair of streams 43a and 43b are taken from the distillation column 49 at intermediate locations to provide the desired $HI-I_2-H_2O$ composition. Substantially all of the water is removed from the column in these two intermediate streams, along with the desired ultimate ratio of hydrogen iodide and iodine. Although under certain circumstances it might be possible to find a point in a distillation column having precisely the desired ratio, it will more likely be necessary to choose two intermediate streams from different locations which are mixed and then condensed to obtain the desired composition to constitute the wet phase stream 43.

Hydrogen iodide vapor carrying perhaps a trace of iodine is removed from the top of the distillation column as a stream 51, condensed and repressurized. The stream 51 is split, and most of it is returned to the catalytic reactor as a stream 52 which is mixed with the incoming hydrogen iodide stream 11. A smaller portion, perhaps about 15 percent of the stream, is mixed with the stream 27 from the gas-liquid separator 25 to constitute the dry phase stream 33 which is supplied to the bottom of the iodine extractor 35. The $I_2$ product exits as a bottom stream 53.

The countercurrent extraction operation proves to be a good method for extracting iodine from the liquid stream produced in the thermal decomposition reactor so that this stream can be immediately returned to the reactor. As a result, the overall process is such that the combined streams 11 and 15 entering the decomposition reactor 13 contain only about 2 moles of HI for each hole of hydrogen recovered. The temperature at which the main reaction is carried out, i.e., preferably between about 350° and about 425° K., coupled with the fact that the exit gas stream contains about twice as many moles of $H_2$ as HI vapor, renders this part of the reaction particularly energy efficient, minimizing the amount of HI to be condensed and scrubbed from the $H_2$ stream.

Under some conditions, a density reversal may occur in the wet and dry phases that requires a slight change in the iodine extraction scheme, as depicted in FIG. 2. At certain temperatures and composition ranges, particularly where low iodine percentages are involved, it is possible that the density of the dry phase may become greater than the density of the wet phase. In such an instance, the countercurrent iodine extractor might be split into two portions 35a and 35b as depicted in FIG. 2. The input stream 23 from the main gas-liquid separator would continue to be supplied to the top of the unit 35a wherein it would move downward in countercurrent arrangement with a rising dry phase. The column would be sized so as to terminate iodine extraction at a point where the density difference is still good enough to allow separation of the more dense aqueous phase from the less dense dry phase. At this point, the wet phase exiting the bottom of the section 35a as stream 36a is mixed with a side stream 36b of more dilute nature, obtained from the top of the section 35b, and combined to form an aqueous stream 36c which is supplied to the bottom of the second extractor section 35b. This recycling of a portion of the output of the second section 35b enhances the density difference between the aqueous phase and the relatively more dense dry HI liquid stream 33, which is now supplied to the top of the section 35b in the FIG. 2 embodiment.

The overhead exit stream from the section 35b is the stream 37 which is substantially free of iodine, and thus the mixing of a portion of it with the stream 36a produces an aqueous phase of very reduced iodine content which, under certain temperature conditions, will be less dense than the dry HI liquid phase supplied by the incoming stream 33. Accordingly, the dry phase sinks in the extraction section 35b and exits from the bottom as the stream 36d which is supplied to the bottom of the extraction 35a wherein it will be lower in density than the wet phase 36a leaving this section which still contains a significant amount of iodine. Accordingly, the dry phase provided by the stream 36d rises in the section 35a in much the same manner as hereinbefore described with regard to the extractor 35 of FIG. 1. The dry phase strips the iodine from the descending wet phase provided by the stream 23 and exits overhead from the extraction section 35a as stream 39. Because of the low level of iodine in both the wet phase and dry phase of the catalyst extractor 41, a density reversal should not occur in the operation of the column 41, and the embodiment shown in FIG. 1 should be valid over all compositions within the column. However, should any such density reversal occur, the situation would be handled by employing a similar arrangement to that depicted in FIG. 2 and explained hereinbefore.

Although the invention has been described with regard to certain preferred embodiments, it should be understood that changes and modifications as would be obvious to one having the ordinary skill in the art may be made without departing from the scope of the invention which is defined in the appended claims. For example, although operation at a pressure of about 5 atm. or higher is preferred in order to provide two liquid phases as generally taught in U.S. Pat. No. 4,330,374 in a stream containing a superazeotropic amount of HI (more than 57 weight % based upon total of HI and $H_2O$), the homogeneous catalysis concept would also be effective in aqueous HI solutions at lower pressures. Particular features of the invention are emphasized in the claims that follow.

What is claimed is:

1. A process for producing $H_2$ from liquid HI, which process comprises the steps of
causing said HI to undergo thermal decomposition in the presence of an aqueous solution of HI and a soluble catalyst at a pressure of between about 25 and about 300 atm.,
separating $H_2$ from the decomposed mixture,
treating said decomposed mixture to extract substantially all of the $I_2$ product therefrom, and
then returning said substantially iodine-free mixture, which contains at least 95 mole % of said catalyst, to said thermal decomposition step.

2. A process in accordance with claim 1 wherein said soluble catalyst is a salt of a platinum group metal.

3. A process in accordance with claim 2 wherein said catalyst is a halide of Pd, Rh or Pt.

4. A process in accordance with claim 1 wherein said decomposed mixture is subjected to countercurrent $I_2$ extraction with a feed stream of relatively dry liquid HI in order to extract $I_2$ and create a first liquid exit stream containing most of the $H_2O$ and at least about 99 mole % of said catalyst.

5. A process in accordance with claim 4 wherein a second relatively dry HI liquid exit stream is created in said countercurrent $I_2$ extraction which contains substantially all of said $I_2$ and a minor percentage of said catalyst, wherein said second exit stream is then subjected to further counter-current extraction with a feed stream containing a significant percentage of $H_2O$ to create a third liquid exit stream containing the remainder of said catalyst and wherein said third exit stream is returned to said thermal decomposition step.

6. A process in accordance with claim 5 wherein HI is separated from said decomposed mixture along with said $H_2$ and is subsequently condensed to separate it from said $H_2$ and wherein said condensed HI forms at least a part of said feed stream in said countercurrent $I_2$ extraction step.

7. A process in accordance with claim 1 wherein said decomposition is carried out at a temperature between about 400° K. and about 425° K. and at a pressure between about 100 atm. and about 175 atm.

8. A process for producing $H_2$ from a liquid mixture containing HI and $H_2O$, which process comprises
causing said HI to undergo thermal decomposition at a temperature of at least about 350° K. but less than the critical temperature of said liquid mixture and at a pressure of at least about 25 atm. in contact with a soluble catalyst that is dissolved along with HI in said $H_2O$ of said liquid mixture and
separating $H_2$ from said decomposed mixture.

9. A process in accordance with claim 8 wherein said catalyst is a halide salt of a platinum group metal.

10. A process in accordance with claim 9 wherein said catalyst is selected from the group consisting of $PdI_2$, $PdCl_2$, $RhCl_3$, $PtI_2$, $H_2PtCl_6$ and mixtures thereof.

11. A process in accordance with claim 10 wherein said liquid mixture is maintained at a pressure of at least about 25 atm. and has a composition such that it forms two liquid phases, a relatively dry HI phase and a wet phase of aqueous hydriodic acid.

12. A process in accordance with claim 11 wherein said catalyst is $PdCl_2$.

13. A process for producing $H_2$ from liquid HI, which process comprises the steps of subjecting a stream containing $H_2O$, HI and a soluble catalyst to a temperature of at least about 400° K. to cause decomposition of HI, the composition of said stream being such that it is superazeotropic in HI and the pressure being maintained such that two liquid phases are present, a relatively dry HI phase and a wet aqueous hydriodic acid phase,
separating $H_2$ from the decomposed mixture,
treating said decomposed mixture to separate said liquid phases and extract substantially all of the $I_2$ product from said wet phase, and then returning said substantially iodine-free wet phase, which contains at least 95 mole % of said catalyst from said stream for another pass through said thermal decomposition step.

14. A process in accordance with claim 13 wherein said soluble catalyst is a salt of a platinum group metal.

15. A process in accordance with claim 14 wherein said catalyst is a halide of Pd, Rh or Pt.

16. A process in accordance with claim 13 wherein said extraction treatment step utilizes countercurrent $I_2$ extraction by a first feed stream of relatively dry liquid HI and creates a first exit stream of said wet phase containing most of the $H_2O$ and at least about 99 mole % of said catalyst.

17. A process in accordance with claim 16 wherein the dry HI phase leaves said countercurrent $I_2$ extraction step as a second exit stream which contains substantially all of said $I_2$ and the remainder of said catalyst, wherein said second exit stream is then subjected to further countercurrent extraction with a second feed stream containing a significant percentage of $H_2O$ that forms a two-phase relationship with said second exit stream and leaves said further countercurrent extraction step as a third exit stream containing the remainder of said catalyst and wherein said third exit stream is returned for another pass through said thermal decomposition step along with said iodine-free wet phase.

18. A process in accordance with claim 16 wherein said pressure is maintained between about 25 and about 300 atm.

19. A process in accordance with claim 16 wherein HI is separated from said decomposed mixture along with said $H_2$ and is subsequently condensed to separate it from said $H_2$ and wherein said condensed HI forms at least a part of said first feed stream.

20. A process in accordance with claim 13 wherein said decomposition is carried out at a temperature between about 400° K. and about 425° K. and at a pressure between about 100 atm. and about 175 atm.

* * * * *

UNITED STATES PATENT AND TRADEMARK OFFICE
CERTIFICATE OF CORRECTION

PATENT NO. : 4,410,505
DATED : October 18, 1983
INVENTOR(S) : Dennis R. O'Keefe and John H. Norman It is certified that error appears in the above-identified patent and that said Letters Patent is hereby corrected as shown below:

Column 5, line 3, change "abut" to --about--,

Column 5, line 39, change "exists" to read --exits--

Column 6, line 14, change "exists" to read --exits--,

Column 6, line 51, change "hole" to read --mole--

Signed and Sealed this

Seventh Day of February 1984

[SEAL]

Attest:

GERALD J. MOSSINGHOFF

Attesting Officer

Commissioner of Patents and Trademarks